United States Patent [19]
Hahn et al.

[11] 3,969,740
[45] July 13, 1976

[54] FILM CASSETTE

[75] Inventors: Werner Hahn; Walter Hennig, both of Dresden; Bernhard Walther, Dessau, all of Germany

[73] Assignee: VEB Pentacon-Dresden, Dresden, Germany

[22] Filed: Dec. 23, 1974

[21] Appl. No.: 535,718

[52] U.S. Cl. ............................... 354/275; 242/71.1; 242/71.2; 354/212; 354/213
[51] Int. Cl.² ..................... G03B 1/22; G03B 17/30
[58] Field of Search ............... 242/71.1, 71.2, 71.7; 354/212, 213, 275; 352/72 R, 78 R

[56] References Cited
UNITED STATES PATENTS 2,381,033  8/1945  Bolsey ............................ 352/78 R
3,865,327  2/1975  Oshima ........................... 242/71.2

*Primary Examiner*—L. T. Hix
*Assistant Examiner*—Russell E. Adams, Jr.
*Attorney, Agent, or Firm*—William A. Drucker

[57]  ABSTRACT

The film cassette comprises a storage and take-up chambers interconnected by a crosspiece. The crosspiece has a transport surface, which faces the camera lens when located in the camera, over which the film is guided and against which the film is pressed by an engagement surface of the camera film gate. The crosspiece is provided with a slot extending in the direction of film transport, the slot passes through the crosspiece, the length of the slot is at least equal to the distance between two successive transport holes in the film.

4 Claims, 4 Drawing Figures

FILM CASSETTE

BACKGROUND TO THE INVENTION

The invention relates to a film cassette with a storage chamber and a take-up chamber and also with a crosspiece which interconnects the said two chambers and the front side of the rear wall of which is constructed as a contact pressure surface for the film.

In known film cassettes of this kind the take-up chamber contains a take-up spool detachably connected via a friction gearing to a transport mechanism on the camera, and the inserted film is provided with a control perforation which can be scanned by the feeler of a locking device for the said transport mechanism. The provision both of a transport device and of a locking device is expensive.

An object of the invention is to simplify the film transport and to provide a film cassette which can be transported, in steps equal at all times, by a gripper operating in the zone of the crosspiece.

SUMMARY OF THE INVENTION

In a film cassette for roll film having transport perforations formed therein; said cassette being suitable for use with cameras having a housing adapted to receive said cassette and a film gate with a film engagement surface therein and film transport mechanism having a drive member engageable with said perforations in said film and performing driving strokes, said cassette comprising:
a. a storage chamber for housing said film:
b. a take-up chamber for receiving said film after exposure:
c. a crosspiece interconnecting said storage and take-up chambers and having a transport surface thereon for guiding said film from the storage chamber to said take-up chamber on the side of the crosspiece nearest the objective lens when the cassette is loaded in the camera; and
d. a transport slot provided in said crosspiece extending in the film transport direction; said slot passing through the crosspiece and having a length at least equal to the distance between successive transport holes in said film; whereby, when the cassette is located in the camera, said film gate presses said film against the transport surface of said crosspiece, and on transport of said film during a driving stroke of said transport mechanism the drive member extends through the slot and into a perforation.

BRIEF DESCRIPTION OF DRAWINGS

In the accompanying drawings.

DESCRIPTION OF PREFERRED EMBODIMENT

Figure 1:
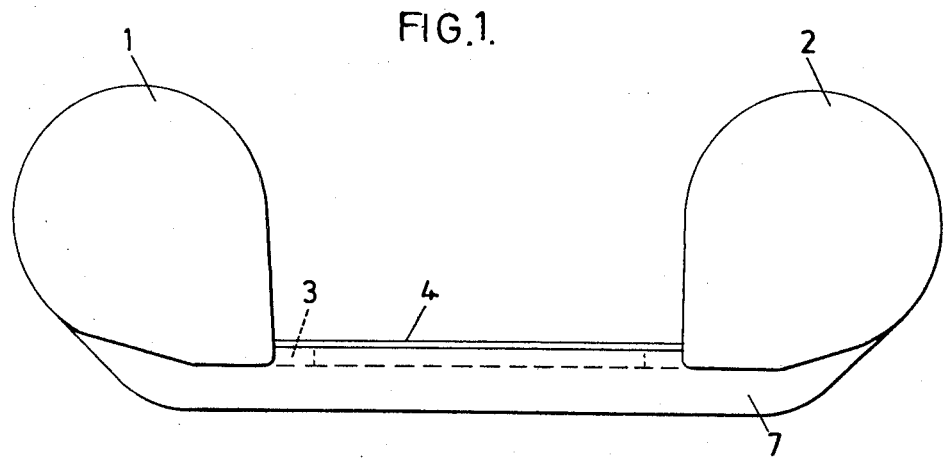
FIG. 1 is a lateral view of a cassette according to the invention.
Figure 2:
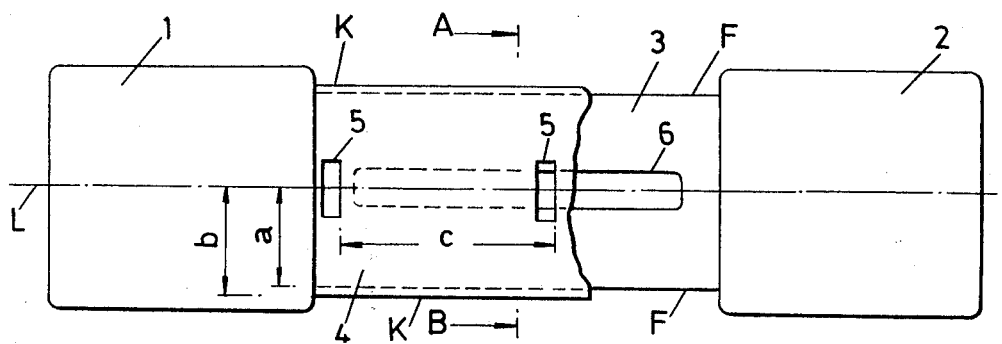
FIG. 2 is the front side of the cassette.
Figure 3:
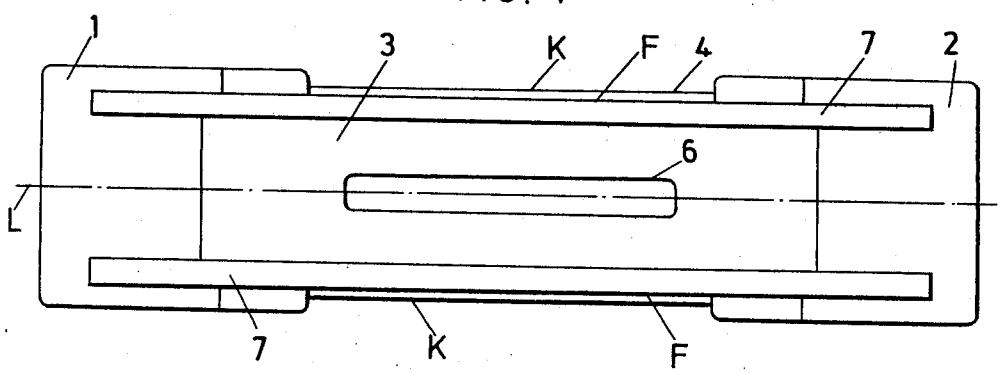
FIG. 3 is the rear side of the cassette.
Figure 4:
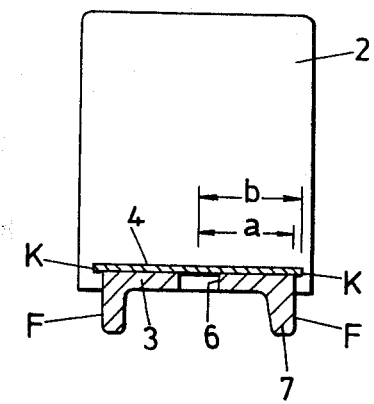
FIG. 4 is a section along the line A – B of FIG. 2.

The film cassette (of FIG. 1) consists of the storage chamber 1 and the take-up chamber 2, rigidly interconnected by the crosspiece 3. In the crosspiece 3 a transport slot 6 (of FIG. 2) is provided in the longitudinal direction L of the cassette. The width of the crosspiece 3 is delimited by the side surfaces F, at a distance $a$ from the longitudinal axis L. The rear side of the crosspiece 3 is provided with ribs 7 of which the outer side surfaces are situated in the same plane as the side surfaces F of the crosspiece 3. These ribs 7 serve to make the crosspiece 3 rigid.

The storage chamber 1 contains the supply of film 4, which consists of a coil not mounted on a spool and of which the leading end extends into the take-up chamber 2. The film 4 has perforations 5, the distance between two successive holes being equal to the length of a "film step". The film 4 is mounted in the cassette symmetrically in respect of the crosspiece 3, the side edges K of the film 4 being at a distance $b$ from the longitudinal axis L of the cassette. The distance $b$ of the side edges K of the film 4 from the longitudinal axis L of the cassette is made greater than the distance $a$ of the side surface F of the crosspiece 3 from the said longitudinal axis L.

The new cassette construction offers the advantages of the conventional cassettes of this type, and in addition to being applicable to systems with film transport claws it has the further advantage that when a cassette of this kind is inserted in the camera the longitudinal edges K of the film can be guided direct in a film gate forming part of the camera itself.

We claim:
1. In a film cassette for roll film having transport perforations formed therein; said cassette being suitable for use with cameras having a housing adapted to receive said cassette and a film gate with a film engagement surface therein and film transport mechanism having a drive member engageable with said perforations in said film and performing driving strokes, said cassette comprising:
a. a storage chamber for housing said film:
b. a take-up chamber for receiving said film after exposure:
c. a crosspiece interconnecting said storage and take-up chambers and having a transport surface thereon for guiding said film from the storage chamber to said take-up chamber on the side of the crosspiece nearest the objective lens when the cassette is loaded in the camera; and
d. a transport slot provided in said crosspiece extending in the film transport direction; said slot passing through the crosspiece and having a length at least equal to the distance between successive transport holes in said film; whereby, when the cassette is located in the camera, said film gate presses said film against the transport surface of said crosspiece, and on transport of said film during a driving stroke of said transport mechanism the drive member extends through the slot and into a perforation.

2. A film cassette according to claim 1, wherein two side surfaces perpendicular to the transport surface of the crosspiece are spaced by a distance smaller than the width of the film.

3. A film cassette according to claim 1, wherein the crosspiece is provided on a surface opposite said transport surface with at least one rib extending over the entire length of the crosspiece.

4. A film cassette according to claim 3, wherein two ribs are provided said transport slot being provided between said ribs.

* * * * *